United States Patent [19]

Maatman et al.

[11] Patent Number: 4,783,367

[45] Date of Patent: Nov. 8, 1988

[54] FIBERS AND YARNS FROM A BLEND OF AROMATIC POLYAMIDES

[75] Inventors: Hendrik Maatman, Arnhem; Bernardus M. Koenders, Westervoort; Franciscus A. M. Schenkels, Dieren, all of Netherlands

[73] Assignee: Akzo N.V., Arnhem, Netherlands

[21] Appl. No.: 42,785

[22] Filed: Apr. 27, 1987

[30] Foreign Application Priority Data

May 6, 1986 [NL] Netherlands ............... 8601159

[51] Int. Cl.$^4$ ........................................... D02G 3/00
[52] U.S. Cl. ........................................ 428/364; 57/902; 428/359; 428/373
[58] Field of Search ............... 428/364, 373; 528/340; 57/251, 244, 200, 905, 243, 902

[56] References Cited

U.S. PATENT DOCUMENTS

| | | |
|---|---|---|
| Re. 30,352 | 7/1980 | Kwolek .................. 524/422 |
| 3,414,645 | 12/1968 | Morgan et al. .......... 264/184 |
| 3,819,587 | 6/1974 | Kwoleck ................. 528/481 |
| 3,869,429 | 3/1975 | Blades ................. 528/340 X |
| 4,162,346 | 7/1979 | Jones, Jr. et al. ........ 428/364 |
| 4,308,374 | 12/1981 | Vollbracht et al. ....... 528/336 |
| 4,320,081 | 3/1982 | Lammers ................ 264/184 |
| 4,368,615 | 1/1983 | Lammers ............. 428/364 X |
| 4,469,748 | 9/1984 | Sharma ................. 428/395 |
| 4,622,265 | 11/1986 | Yoon et al. ............. 428/364 |

FOREIGN PATENT DOCUMENTS

| | | |
|---|---|---|
| 007631 | 2/1980 | European Pat. Off. . |
| 57-115452 | 7/1982 | Japan . |
| 6908984 | 12/1969 | Netherlands . |
| 2160878 | 6/1984 | United Kingdom . |

*Primary Examiner*—Lorraine T. Kendell
*Attorney, Agent, or Firm*—Parkhurst, Oliff & Berridge

[57] ABSTRACT

Fibers made from a blend of poly-p-phenylene terephthalamide (PPDT) and a copolyamide derived from p-phenylene diamine, terephthalic acid and a naphthalenic difunctional monomer show improved properties, particularly tenacity, compared with PPDT fibers. The blend can be processed in the same manner as the PPDT polymer.

5 Claims, No Drawings

FIBERS AND YARNS FROM A BLEND OF AROMATIC POLYAMIDES

The invention relates to fibers which entirely or substantially consist of a blend of aromatic polyamides, and a yarn more particularly tire yarn, entirely or partly composed of such fibers.

Fibers from aromatic polyamides are well-known and are preferably obtained by wet spinning from a solution in concentrated sulphuric acid, use being made of an air gap as indicated in U.S. Pat. No. 3,414,645.

Of industrial importance have meanwhile become especially fibers from poly-p-phenylene terephthalamide (PPDT). Because of their special properties, including notably high thermal stability and high strength and modulus, the fibers are of significance for special technical uses.

Fibers from other aromatic homopolyamides or copolyamides have in principle similar properties, but up to now there is no comparison yet between their technical importance and that of PPDT. This is even more true as far as blends of aromatic polyamides are concerned. In NL-A-6,908,984 (Examples XV-XVII) incidental mention is made of a blend of PPDT and poly-p-benzamide. Apparently, this blend does not offer any special advantages.

In GB-A-2 160 878 polymer alloy fibers are described consisting of PPDT and a mixed aromatic-aliphatic copolyamide. The aliphatic component in the copolyamide is meant to restrain the fibrillation of the wholly aromatic fibers.

In JP-A-57/115452 high strength fibers of polyamide blends capable of being molded in a molten state are described. This is achieved by blending a limited amount of a wholly aromatic polyamide like PPDT with a melt-processable polyamide, which may contain naphthalene units and has a relatively low melting point.

Especially in technical uses where dynamic loading plays a role, as in automobile tires, V-belts, hose material, cables and ropes, the mechanical behavior of the well-known fibers from aromatic polyamides is not always optimal. Particularly there is need for fibers which, while having the same or a relatively high elongation, possess a higher tenacity and which can yet be obtained directly by the usual as-spun method, i.e. without use being made of any special treatment other than washing and drying.

A blend of aromatic polyamides has now been found from which fibers are obtained displaying properties improved in the respect mentioned above.

According to the invention the blend is characterized in that it is composed of poly-p-phenylene terephthalamide (PPDT) and a copolyamide derived from p-phenylene diamine, terephthalic acid and at least one other monomer selected from naphthalene dicarboxylic acids and napthalene diamines having the acid and amine groups separated by at least two substitutable carbon atoms in the naphthalene nucleus.

By substitutable carbon atoms are meant those carbon atoms which can carry substituents, thus excluding the two carbon atoms combining the phenyl-groups to a naphthalene unit. Said substitutable carbon atoms are usually numbered 1 to 8.

There are five possible structures for both the diacids and diamines meeting the above condition. For the practice of the invention the 1,5- and 2,6-naphthalene diacids and diamines are preferred.

The copolyamide is normally prepared from the monomers as a random copolymer, but its preparation may also be performed so as to give a block-copolymer.

It has been found that the use of said copolyamide results in a blend leading to fibers having the envisaged properties. Presumably, this has to do with the presence in the copolyamide of naphthalene units. These units, even if present to a low degree, apparently lead to an improvement of PPDT properties in the sense envisaged.

For practical purposes it is desirable that the copolyamide to be blended with PPDT contains at least 1.5% by weight of naphthalene units, which amounts to about 2 mole.% relative to acid or amine derived units. As regards use on an industrial scale, however, the separate copolyamide should not be employed in the blend in a proportion higher than 50% by weight, even considering its possibly favorable effect on properties. On the contrary, depending on the effect to be attained, it is preferred that the copolyamide, which is to be prepared separately after all, should be blended in the smallest possible quantity with PPDT. It is therefore more favorable for the copolyamide to be used in an amount of less than 25% by weight and preferably less than 10% by weight. In general, however, at least 2% by weight of copolyamide will be needed in the blend in order for it to be effective, certainly if the copolyamide contains a relatively low proportion of naphthalene units.

Fibers prepared from PPDT in the usual manner generally have a tenacity of about 2100 mN/tex at an elongation of practically 3%. The ASTM-D 885 modulus is usually at a level of 70 GPa.

For fibers prepared from the afore-mentioned copolyamide, lower strength values are normally found. Surprisingly, however, it is found that for fibers from a blend of said polyamides, depending on the composition, a significantly higher tenacity is obtained. For instance on fibres containing 5% by weight of copolyamides having a content of from 1.5% by weight of naphthalene units, tenacities are measured which range from about 2200 mN/tex to over 2600 mN/tex and may be even as high as 3000 mN/tex.

Considering the two principle variables in the present blends, i.e. the blending ratio and the composition of the copolyamide, optimum results are normally found in the range where the blend contains 2 to 10 wt.% of a copolyamide containing 2 to 10 mole.% of naphthalene units relative to acid or amine derived units.

Upon applying a higher tension to the fibers while still wet it appears that the ASTM modulus can still be increased. A further increase in modulus can be realized by hot afterdrawing.

The elongation at rupture of the fibers according to the invention will as a rule remain at a level of 3 to 4%.

The polyamide components of the present blends are known in themselves and may be obtained by the usual methods. For instance, PPDT is obtained by polymerization, in a suitable solvent, of p-phenylene diamine and terephthaloyl dichloride, and the copolyamide by polymerization of p-phenylenediamine, the naphthalene diamine or dicarboxylic acid chloride and terephthaloyl dichloride. The polymers should have a viscosity which is sufficiently high for fibers, which amounts to an inherent viscosity of at least 2.5 and preferably higher than 4.0. U.S. Pat. No. 4,308,374 describes a particularly suitable method of preparing these polymers as far as PPDT is concerned. By inherent viscosity is to be understood here the value calculated in accordance with $\eta_{inh} = \ln \eta_{rel}/0,5$, where $\eta_{rel}$ is the relative viscosity measured with a capillary viscosimeter at 25° C. of a solution of 0.5 g polyamide in 100 ml of 96%-sulphuric acid.

The procedure for spinning fibers from solutions of aromatic polyamides in concentrated sulphuric acid is generally known and requires no further description here. A special method which is particularly suitable notably for PPDT is described in U.S. Pat. No. 4,320,081.

The term fibers used in the present specification covers all usual types of fibers, irrespective of their length, from staple fibers to endless filaments.

In view of the properties it is especially the yarns made from the fibers according to the invention, more particularly tire yarns, that are considered to be of importance.

The invention will be further described in the following example presenting results obtained in various experiments.

EXAMPLE a. Preparation of PPDT

In accordance with the procedure of Example VI of U.S. Pat. No. 4,308,374, but on a larger scale, PPDT was prepared in a mixture of N-methyl pyrrolidone and calcium chloride at a calcium chloride content of 9.5% by weight, calculated on the total reaction mass. The ratio of the monomers p-phenylene diamine and terephthaloyl dichloride was 0.997 and the total monomer concentration was 13% by weight, calculated on the total reaction mass. After neutralizing, washing and drying a polymer was obtained having an inherent viscosity of 5.4.

b.

(i) Preparation of copolyamide with 2,6-naphthalene units

The same procedure was used for preparing the copolyamide in a 1-1 reactor and in a medium of 470 g of N-methyl pyrrolidone and 55 g of calcium chloride. The monomer concentration was again about 13% by weight, use being made of 27.36 g of p-phenylene diamine and, depending on the desired naphthalene content, 1.33 to 4.60 g of 2,6-naphthalene dicarboxylic acid chloride and 47.73 to 50.41 g of terephthaloyl dichloride. The reaction time was thirty minutes and the temperature about 50° C. Obtained was a polymeric product having an inherent viscosity of 4.8 at the lowest to 6.0 at the highest naphthalene content.

(ii) Preparation of copolyamide with 1,5-naphthalene units

This copolyamide was prepared in a medium of 495 g of N-methyl pyrrolidone and 45 g of calcium chloride. After dissolution in this medium of 25.16 g of p-phenylene diamine and 1.998 g of 1.5-naphthalene diamine, reaction was started at a temperature of about 20° C. with the addition of 49.74 g of terephthaloyl dichloride. The reaction time was about fifteen minutes and there was obtained a polymeric product having a relative viscosity of 3.31.

c. Preparation of spinning solutions

As solvent was used concentrated sulphuric acid having a strength of 99.8%. The solutions were prepared via mixing of in all 495 g of polymer with 2005 g of solid, cooled sulphuric acid, as described in Example III of U.S. Pat. No. 4,320,081.

d. Spinning procedures

The polymer solutions having a polymer content of about 19.8% by weight were spun by the air gap spinning method essentially as described in Example III of U.S. Pat. No. 4,320,081, employing a spinneret with 50 orifices each having a diameter of 75 μm. Use was made of a spinning temperature of about 80° C., a winding speed of 180 m/min and a coagulation bath temperature of 14° C. In the coagulation bath the filaments were passed through a ring having an opening of 10 mm in diameter and guided over a ceramic pin. The resulting filaments were wound up while under a tension or not and washed in water of 14° C., neutralized in a 1% by weight-sodium carbonate solution of 60° C. and subsequently washed in water of 60° C. Finally, the filaments were dried to the air.

e. Filament tensile tests

The stress-strain data were collected in conformity with ASTM-D 2101 by conducting tensile tests on individual filaments with the aid of an Instron tensile tester. The nominal gauge length was 0.10 m and the rate of extension 0.01 m/min. The filaments had previously been conditioned at 20° C. and a relative humidity of 65%. For each type of filament the average result of 10 filament tensile tests was calculated.

The test results obtained with the various polymer blends according to the invention are summarized in the tables.

The experiments in the tables labeled standard are control experiments carried out with the homopolyamide PPDT. The difference in tenacity values found for the various standards is a measure of the extent to which the homopolyamide batches were washed free of impurities. The washing operation may entail up to twenty or more washing cycles using a moderate to large excess of water at ambient or elevated temperature.

The mole.% naphthalene indicates the number of moles of naphthalene units per 100 moles of total acid or amine derived units in the copolyamide. Thus, 2.1 mole.% corresponds to about 1.6% by weight of units in the copolyamide. In Tables 1, 2 and 3 the naphthalene units originate from the use of 2,6-naphthalene dicarboxylic acid chloride and in Table 4 from the use of 1,5-naphthalene diamine in the preparation of the copolyamide.

The tension in cN/dTex indicates the tension applied to the filaments while in the wet state and prior to their being wound up. The modulus is the measured ASTM-D 885 modulus in giga pascal.

The values for the tenacity and the modulus are clearly found to increase in the presence of the copolyamide with increasing content of naphthalene units and also upon increasing the tension prior to the winding operation. The highest single tenacity value was found in the experimental series 22-24 at a tension of 0.2 cN/dTex and amounted to 365 cN/Tex. Translating this value into gram per denier at a nominal gauge length of 2.5 cm the tenacity amounts to about 45 g/denier.

TABLE 1

| Exp. | Copolyamide wt. % in blend | Copolyamide mol. % naphthalene | Titer dTex | Tension cN/dTex | Modulus gPa | Tenacity cN/Tex | Elong. (%) |
| --- | --- | --- | --- | --- | --- | --- | --- |
| 1 | 0 (standard) | — | 2.22 | 1.0 | 82 | 195 | 3.2 |
| 2 | 5 | 2.1 | 2.29 | 0 | 77 | 204 | 3.6 |
| 3 | 5 | 2.1 | 2.41 | 1.6 | 87 | 221 | 3.3 |
| 4 | 5 | 4.2 | 2.25 | 0 | 69 | 214 | 3.9 |
| 5 | 5 | 4.2 | 2.27 | 1.6 | 89 | 228 | 3.6 |
| 6 | 5 | 10 | 1.83 | 1.6 | 104 | 213 | 2.9 |
| 7 | 5 | 10 | 1.85 | 3.2 | 135 | 233 | 2.5 |
| 8 | 10 | 10 | 2.30 | 1.6 | 93 | 240 | 3.5 |
| 9 | 10 | 10 | 2.28 | 3.2 | 130 | 239 | 2.7 |

TABLE 2

| Exp. | Copolyamide wt. % in blend | Copolyamide mol. % naphthalene | Titer dTex | Tension cN/dTex | Modulus gPa | Tenacity cN/Tex | Elong. (%) |
| --- | --- | --- | --- | --- | --- | --- | --- |
| 10 | 0 (standard) | — | 2.24 | 0 | 51 | 230 | 4.2 |
| 11 | 5 | 7.2 | 2.28 | 0 | 62 | 237 | 3.9 |
| 12 | 5 | 7.2 | 2.29 | 1.6 | 101 | 247 | 3.3 |
| 13 | 5 | 7.2 | 2.08 | 3.2 | 125 | 264 | 3.1 |

TABLE 3

| Exp. | Copolyamide wt. % in blend | Copolyamide mol. % naphthalene | Titer dTex | Tension cN/dTex | Modulus gPa | Tenacity cN/Tex | Elong. (%) |
| --- | --- | --- | --- | --- | --- | --- | --- |
| 14 | 0 (standard) | — | 2.14 | 1.6 | 96 | 238 | 3.4 |
| 15 | 0 (standard) | — | 2.05 | 3.2 | 128 | 252 | 3.0 |
| 16 | 1.25 | 7.5 | 2.34 | 0 | 82 | 241 | 3.7 |
| 17 | 1.25 | 7.5 | 2.36 | 1.6 | 90 | 241 | 3.5 |
| 18 | 1.25 | 7.5 | 2.21 | 3.2 | 121 | 254 | 3.1 |
| 19 | 2.5 | 7.5 | 1.96 | 0 | 72 | 243 | 3.9 |
| 20 | 2.5 | 7.5 | 2.04 | 1.6 | 95 | 246 | 3.5 |
| 21 | 2.5 | 7.5 | 1.92 | 3.2 | 119 | 255 | 3.1 |
| 22 | 5 | 7.5 | 2.03 | 0 | 65 | 257 | 4.2 |
| 23 | 5 | 7.5 | 2.02 | 1.6 | 86 | 269 | 3.8 |
| 24 | 5 | 7.5 | 1.83 | 3.2 | 117 | 267 | 3.2 |
| 25 | 10 | 7.5 | 2.22 | 0 | 74 | 244 | 3.9 |
| 26 | 10 | 7.5 | 2.24 | 1.6 | 101 | 245 | 3.3 |
| 27 | 10 | 7.5 | 2.35 | 3.2 | 103 | 246 | 3.2 |
| 28 | 25 | 7.5 | 2.31 | 0 | 54 | 248 | 4.4 |
| 29 | 25 | 7.5 | 2.25 | 1.6 | 90 | 242 | 3.5 |
| 30 | 25 | 7.5 | 2.28 | 3.2 | 110 | 249 | 3.3 |
| 31 | 100 | 7.5 | 2.04 | 0 | 68 | 227 | 4.1 |
| 32 | 100 | 7.5 | 1.92 | 1.6 | 114 | 246 | 3.4 |

TABLE 4

| Exp. | Copolyamide wt. % in blend | Copolyamide mol. % naphthalene | Titer dTex | Tension cN/dTex | Modulus gPa | Tenacity cN/Tex | Elong. (%) |
| --- | --- | --- | --- | --- | --- | --- | --- |
| 33 | 0 (standard) | — | 2.26 | 0 | 58 | 216 | 3.8 |
| 34 | 0 (standard) | — | 2.30 | 1.6 | 78 | 225 | 3.5 |
| 35 | 0 (standard) | — | 2.34 | 3.2 | 113 | 219 | 2.9 |
| 36 | 5 | 5 | 2.29 | 0 | 49 | 229 | 4.2 |
| 37 | 5 | 5 | 2.26 | 1.6 | 80 | 242 | 3.8 |
| 38 | 5 | 5 | 2.19 | 3.2 | 116 | 240 | 3.1 |

We claim:

1. Fibers consisting essentially of a blend of poly-p-phenylene terephthalamide and another aromatic polyamide, wherein the other polyamide is a copolyamide derived from p-phenylene diamine, terephthalic acid and at least one other monomer selected from the group consisting of naphthalene dicarboxylic acids and naphthalene diamines having the acid and amine groups separated by at least two substitutable carbon atoms in the naphthalene nucleus, the blend containing 2 to 50% by weight of the copolyamide.

2. Fibers according to claim 1, characterized in that the other monomer is selected from 1,5- and 2,6-naphthalene dicarboxylic acids and naphthalene diamines.

3. Fibers according to claim 1, characterized in that the copolyamide contains at least 1.5% by weight of naphthalene units.

4. Fibers according to claim 1, characterized in that the blend contains 2 to 10 wt.% of a copolyamide containing 2 to 10 mole.% of naphthalene units relative to acid or amine derived units.

5. A yarn composed of the fibers of claim 1.

UNITED STATES PATENT AND TRADEMARK OFFICE
CERTIFICATE OF CORRECTION

PATENT NO. : 4,783,367

DATED : November 8, 1988

INVENTOR(S) : H. Maatman; B. Koenders; F. Schenkels

It is certified that error appears in the above-identified patent and that said Letters Patent is hereby corrected as shown below:

Column 3, line 59, change "1.5-naphthalene" to --1,5-naphthalene--.

Signed and Sealed this

Thirty-first Day of October, 1989

Attest:

DONALD J. QUIGG

*Attesting Officer*  *Commissioner of Patents and Trademarks*